United States Patent [19]

Sato

[11] Patent Number: 5,139,465
[45] Date of Patent: Aug. 18, 1992

[54] 2-PATH HYDROMECHANICAL TRANSMISSION SYSTEM AND METHOD OF PRODUCING THE SAME

[75] Inventor: Masayuki Sato, Komatsu, Japan

[73] Assignee: Kabushiki Kaisha Komatsu Seisakusho, Tokyo, Japan

[21] Appl. No.: 768,087

[22] PCT Filed: Mar. 14, 1990

[86] PCT No.: PCT/JP90/00333
§ 371 Date: Sep. 26, 1991
§ 102(e) Date: Sep. 16, 1991

[87] PCT Pub. No.: WO90/12225
PCT Pub. Date: Oct. 18, 1990

[30] Foreign Application Priority Data

Mar. 31, 1989 [JP] Japan ................................. 1-82963

[51] Int. Cl.$^5$ ............................................. F16H 3/44
[52] U.S. Cl. ........................................ 475/24; 475/28
[58] Field of Search ............................ 475/24, 28, 73

[56] References Cited

U.S. PATENT DOCUMENTS

| | | | |
|---|---|---|---|
| 3,529,492 | 9/1970 | Tuck | 475/24 |
| 3,538,790 | 11/1970 | Polak | 475/24 |
| 4,183,264 | 1/1980 | Reed | 475/24 |
| 4,799,401 | 1/1989 | Reed | 475/24 |
| 4,995,276 | 2/1991 | Zannberger | 475/24 X |
| 4,997,412 | 3/1991 | Reed | 475/24 |
| 5,026,333 | 6/1991 | Meyerle | 475/24 X |
| 5,030,177 | 7/1991 | Reed | 475/24 |

FOREIGN PATENT DOCUMENTS

46-10370 3/1971 Japan .
55-10174 1/1980 Japan .
64-65352 3/1989 Japan .

Primary Examiner—Dirk Wright
Attorney, Agent, or Firm—Richards, Medlock & Andrews

[57] ABSTRACT

A two-path hydromechanical transmission system used in a crawler-type vehicle and a method of controlling this transmission system. Excellent maneuverability and high degree of running course steadiness at low tramming speed, as well as high power transmission efficiency at high tramming speed, are obtained by the use of hydraulic pumps and motors of capacities smaller than those of known systems. The transmission system has a power transmission line including independent left and right hydraulic pumps 2, 3 driven by an engine 1 mounted on a vehicle and motors 4, 5 and reduction planetary gear trains 200, 250 having reduction gear trains 100, 150 for transmitting the output torques of said hydraulic motors to left and right driving wheels. The transmission system also has an additional power transmission line including a reduction gear device 300 for distributing the output torque of said engine 1 and said reduction planetary gear trains 200, 250 for transmitting the output torques of said reduction gear device to said left and right driving wheels. This transmission system is controlled in different modes for tramming at low and high tramming speeds.

19 Claims, 5 Drawing Sheets

2-PATH HYDROMECHANICAL TRANSMISSION SYSTEM AND METHOD OF PRODUCING THE SAME

TECHNICAL FIELD

The present invention relates to a speed-changing/steering system which is used on a vehicle and which has both linear speed-changing and steering functions, as well as to a method of controlling such a system. More particularly, the present invention is concerned with a 2-path hydromechanical transmission system for use in crawler-type vehicles and also to a method of controlling such a transmission system.

BACKGROUND ART

Figure 6:
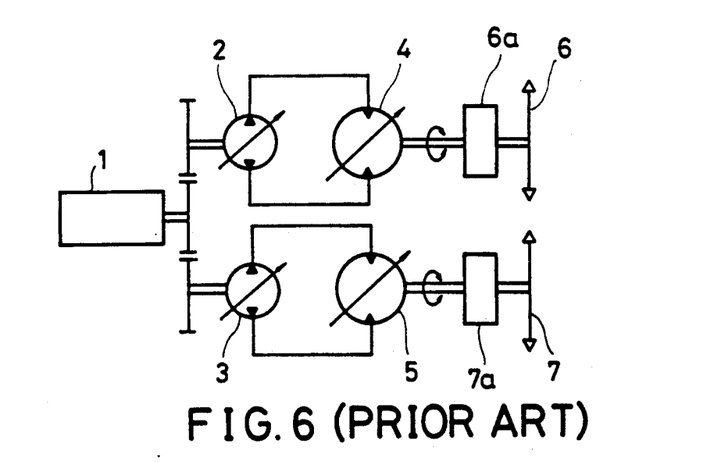
FIG. 6 is an illustration of the paths of power transmission in a known 2-path HST system.

FIG. 6 shows a conventional power transmission system which is used on crawler-type vehicles such as bulldozers and which is capable of performing both linear speed change and steering. This system, known as 2-path hydrostatic transmission (referred to as 2-path HST, hereinafter) has, for the left and right crawler driving wheels 6, 7, hydraulic pumps 2, 3 driven by an engine 1, hydraulic motors 4, 5 and reduction devices 6a, 6b.

The power transmission system having such a 2-path HST, however, suffers from the following disadvantages due to the fact that all of the torque is transmitted through the HST.

(1) Power transmission efficiency is low although the operability is superior.

(2) This type of power transmission system is difficult to apply to large-size vehicles because hydraulic pumps and hydraulic motors capable of transmitting large power are not readily available are or, if available, very expensive.

(3) Straight running performance of the vehicle is affected by efficiencies of the hydraulic pumps and motors.

(4) A complicated control is required for keeping the running course of the vehicle when the control is to be done through the control of operation of the hydraulic pumps and motors.

Accordingly, an object of the present invention is to provide a 2-path hydromechanical transmission (referred to as 2-path HMT, hereinafter) which employs an HST incorporating hydraulic pumps and motors of small capacities and which exhibit high efficiency with simple construction and ease of maneuver, as well as a control method for controlling such a 2-path HMT, thereby overcoming the above-described problems of the prior art.

SUMMARY OF THE INVENTION

To this end, according to the present invention, there is provided a 2-path hydromechanical transmission system, comprising: a power transmission line including independent left and right hydraulic pumps driven by an engine mounted on a vehicle and motors associated with the hydraulic pumps, and reduction planetary gear trains having reduction gear trains and differential planetary gear devices for transmitting the output torques of the hydraulic motors to left and right driving wheels of the vehicle; and an additional power transmission line including a reduction gear device having a bevel gear for distributing the output torque of the engine and forward and reverse 2nd speed clutches to which the output torque of the engine is distributed, and the reduction planetary gear trains for transmitting the output torques of the reduction gear device to the left and right driving wheels.

Left and right drive shafts to which the reduction gear trains and the reduction planetary gear trains are secured are connected to each other through a coupling device having a center clutch.

When the vehicle trams forward at a low speed, an engine mounted on the vehicle drives left and right hydraulic pumps to actuate hydraulic motors, the output torques of the hydraulic motors being transmitted to left and right driving wheels via reduction gear trains and other components, whereas, when the vehicle runs in the reverse direction, the left and right hydraulic motors are reversed.

When the vehicle is steered to the left or right, the connection between left and right drive shafts to which the reduction gear trains and other components are secured is dismissed by disengagement of a center clutch in the coupling device interconnecting the drive shafts, and the operation speeds of the left and right hydraulic motors are made to differ to cause a difference in the rotation speed between the left and right driving wheels, thereby causing the vehicle to be steered.

When the vehicle trams forward at a high speed, a forward 2nd-speed clutch and the center clutch are engaged, whereas, when the vehicle trams in the reverse direction at a high speed, a reverse 2nd-speed clutch and the center clutch are engaged, and the output torque of an engine mounted on the vehicle is mechanically transmitted to planetary carriers of differential planetary gear devices through a reduction device including a bevel gear which distributes the engine output torque and forward/reverse 2nd-speed clutches to which the engine output torque is distributed by the bevel gear, and at the same time, independent left and right hydraulic pumps also are driven by the engine so as to drive associated hydraulic motors the output torques of which are transmitted to sun gears of the differential planetary gear devices via reduction gear trains, so that the driving power transmitted mechanically and the driving power transmitted hydraulically are added together at the differential planetary gear devices, whereby the sums of the mechanically transmitted power and hydraulically transmitted power are transmitted to the left and right driving wheels.

Furthermore, according to the method of the invention, the tramming speed of the vehicle is controlled by increasing and decreasing rotation speeds of hydraulic motors driven by an engine mounted on the vehicle when the tramming speed is low, whereas, when the vehicle is accelerated during tramming at a high speed, a control is conducted such that the rotation speeds of the hydraulic motors is progressively decreased to zero and then the hydraulic motors are reversed and increase their rotation speeds in the reverse direction.

Thus, according to the invention, different modes of transmission of engine output torque to the driving wheels are selectively used according to the tramming speed: namely, a low-speed mode in which the engine output torque is transmitted to the driving wheels through an HST system, and a high-speed mode in which the engine output torque is transmitted to the driving wheels both through the HST system and an HMT system which transmits the torque mechanically. In addition, left and right drive shafts for transmitting the torques to the left and right driving wheels are connected to each other at the center of the vehicle, in order to obtain a high level of steadiness or course-holding characteristic during straight running. It is therefore possible to obtain superior maneuverability and high degree of straight course steadiness during tramming at low speed, as well as high power transmission efficiency at high tramming speed, by employing hydraulic pumps and hydraulic motors of reduced capacities.

THE BEST MODE FOR CARRYING OUT THE INVENTION

A detailed description will be given of the 2-path HMT system embodying the present invention, as well as a method of controlling the same.

Figure 1:
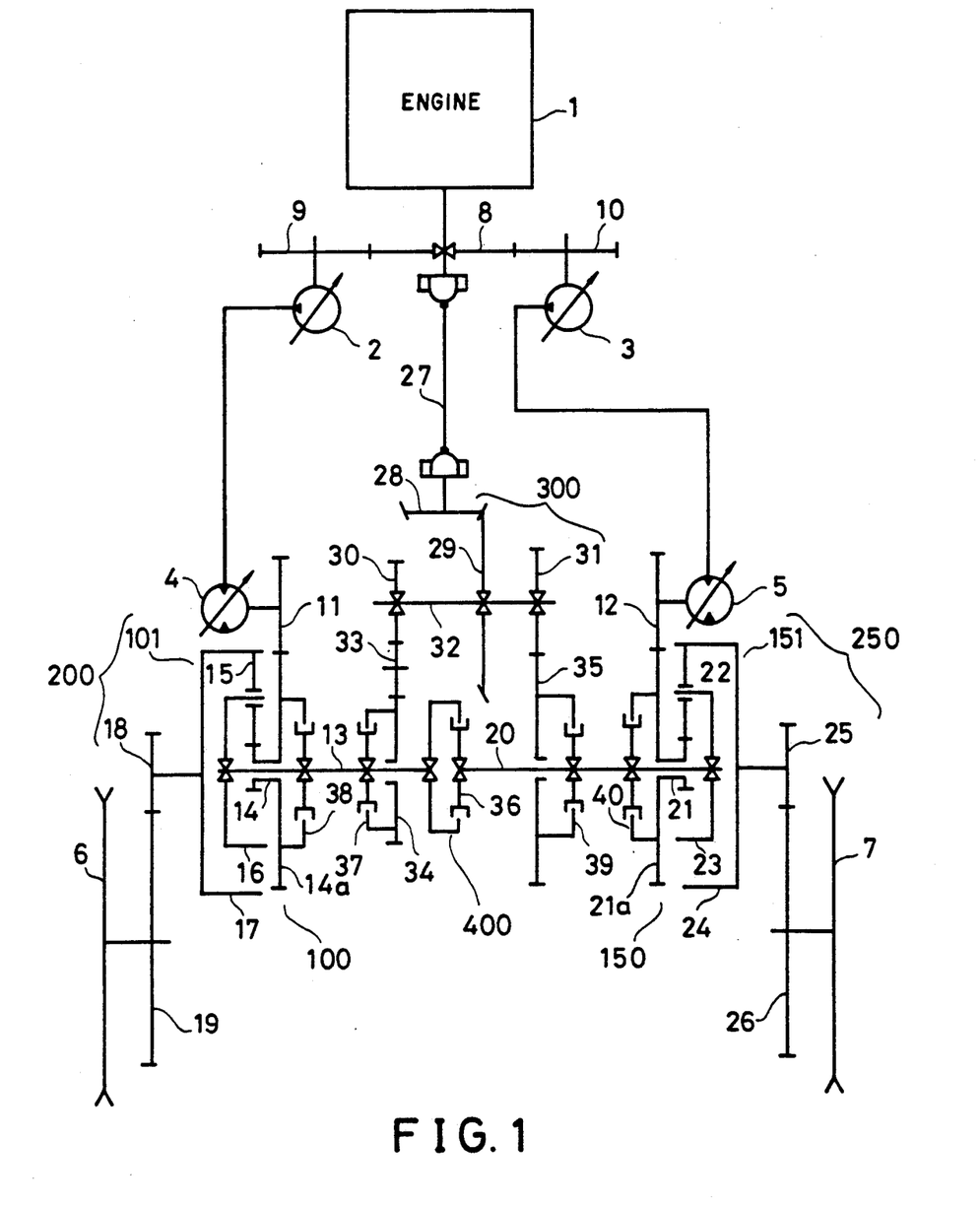
FIGS. 1, 2 and 3 are illustrations of the paths of power transmission in 2-path HMT system embodying the present invention.

Referring to FIG. 1, a 2-path HMT system has two power transmission lines: namely, a first power transmission line in which output torque of an engine 1 is transmitted to left and right drive wheels 6, 7, through independent transmission lines including hydraulic pumps 2, 3, hydraulic motors 4, 5, and reduction planetary gear trains 200, 250 including reduction gear trains 100, 150 and differential planetary gears 101, 151; and a second power transmission line in which the output torque of the engine 1 is transmitted to and divided by a reduction device 300 having a bevel gear 28 and forward/backward 2-speed clutches 37, 39, the divided torque being then transmitted to the left and right driving wheels 6, 7 through the above-mentioned reduction planetary gear trains 200, 250.

Referring first to the above-mentioned first power transmission line, a left hydraulic pump 2 and a right hydraulic pump 3 are driven by a left PTO driven gear 9 and a right PTO driven gear 10 which mesh with a PTO drive gear 8 fixed to the output shaft of the engine 1. These hydraulic pumps 2 and 3 are connected, through hydraulic lines, to left and right hydraulic motors 4 and 5 which respectively drive left and right motor gears 11 and 12, respectively.

A left reduction gear train 100 is composed of the left motor gear 11 and a left sun gear 14a which idles on a left drive shaft 13 and which meshes with the left motor gear 11. The left reduction planetary gear train 200 includes: a differential planetary gear device 101 including a left sun gear 14, a left planetary gear 15, a left planet carrier 16 and a left ring gear 17; a left final drive gear 18 directly connected to the left ring gear 17; and a left final driven gear 19. The reduction gear train 150 and the reduction planetary gear train 250 for the right driving wheel have constructions similar to those for the left driving wheel. Namely, the reduction gear train 150 for the right driving wheel includes the right motor gear 12 and a right sun gear 21a which idles on a right drive shaft 20 and which meshes with the right motor gear 12. The reduction planetary gear train 250 for the right driving wheel includes: a differential planetary gear device 151 composed of a right sun gear 21, a right planetary gear 22, a right planetary carrier 23 and a right ring gear 24; a right final drive gear 25 directly connected to the right ring gear 24; and a right final driven gear 26.

The second line of power transmission will now be described. The output shaft of the engine 1 is connected through a propeller shaft 27 to a bevel pinion 28 meshing with a bevel gear 29 which is fixed to a bevel shaft 32 together with forward 2nd (referred to as F2) drive gear 30 and a reverse 2nd (referred to as R2) drive gear 31. A forward gear train is composed of the F2 drive gear 30, an idler gear 33 meshing with the F2 drive gear 30 and an F2 driven gear 34 which idles on the left drive shaft 13 and meshes with the idle gear 33. A reverse gear train is composed of the R2 drive gear 31 and an R2 driven gear 35 which idles on the right drive shaft 20 and meshes with the R2 drive gear 31.

The left drive shaft 13 and the right drive shaft 20 are coupled to each other through a coupling device 400 having a center clutch 36 and other parts.

The F2 driven gear 34, left sun gear 14, R2 driven gear 35 and the right sun gear 21 are respectively associated with an F2 clutch 37, a left 1st speed clutch 38, an R2 clutch 39 and a right 1st-speed clutch 40.

The operation of the described system is as follows.

Figure 2:
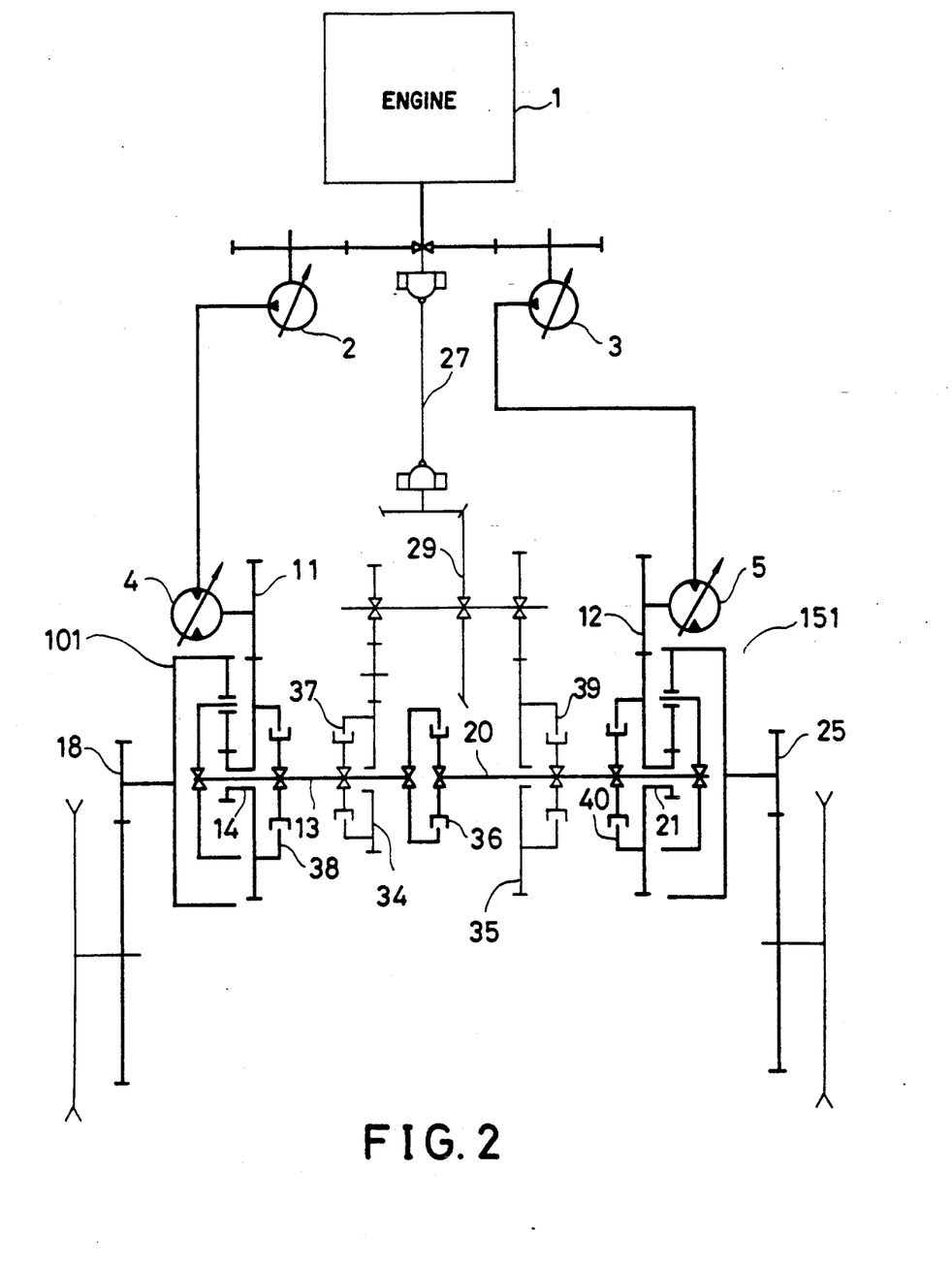
Figure 4:
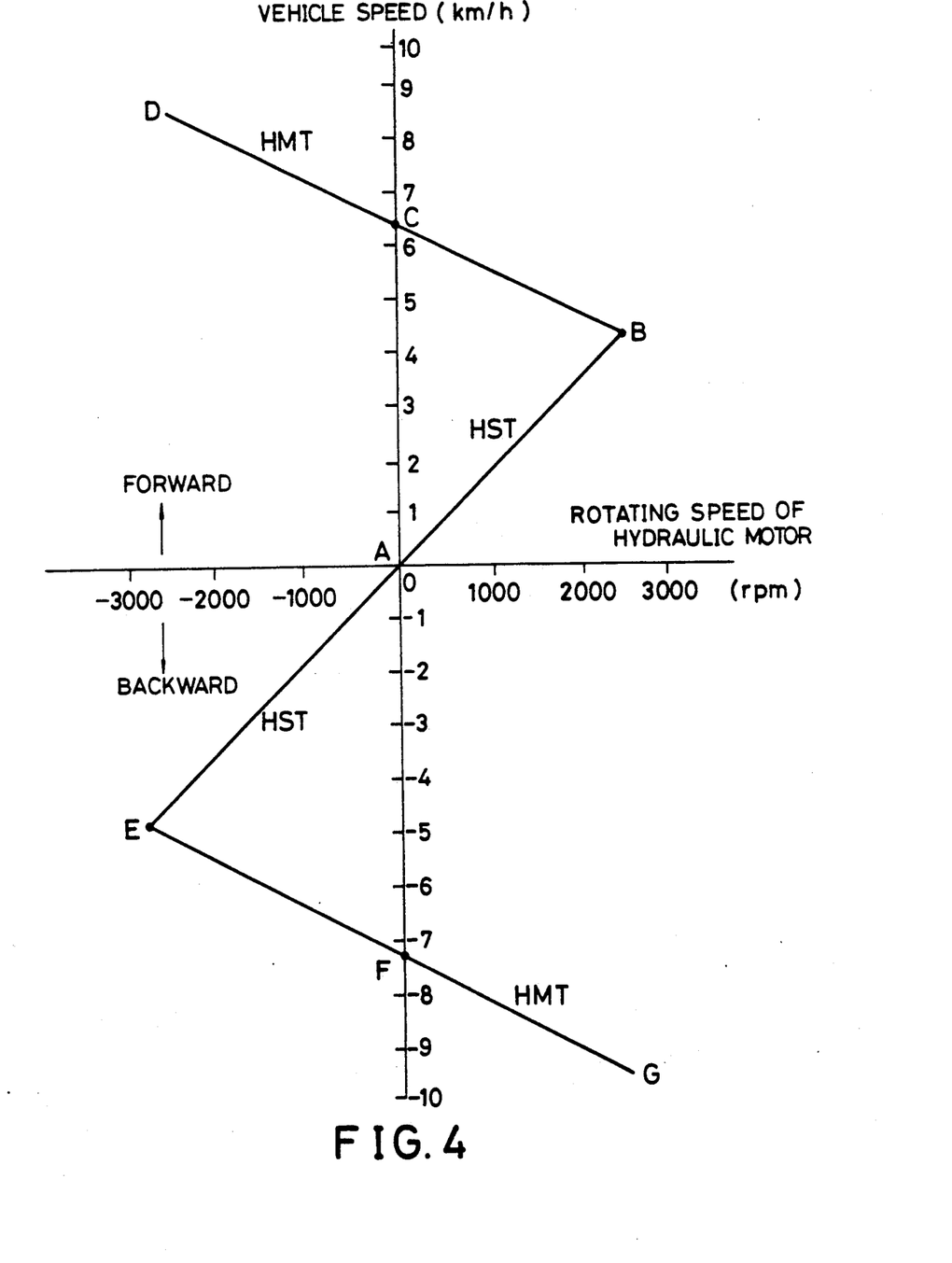
FIG. 4 is a chart illustrating the relationship between rotation speed of hydraulic motor and vehicle speed.
Figure 5:
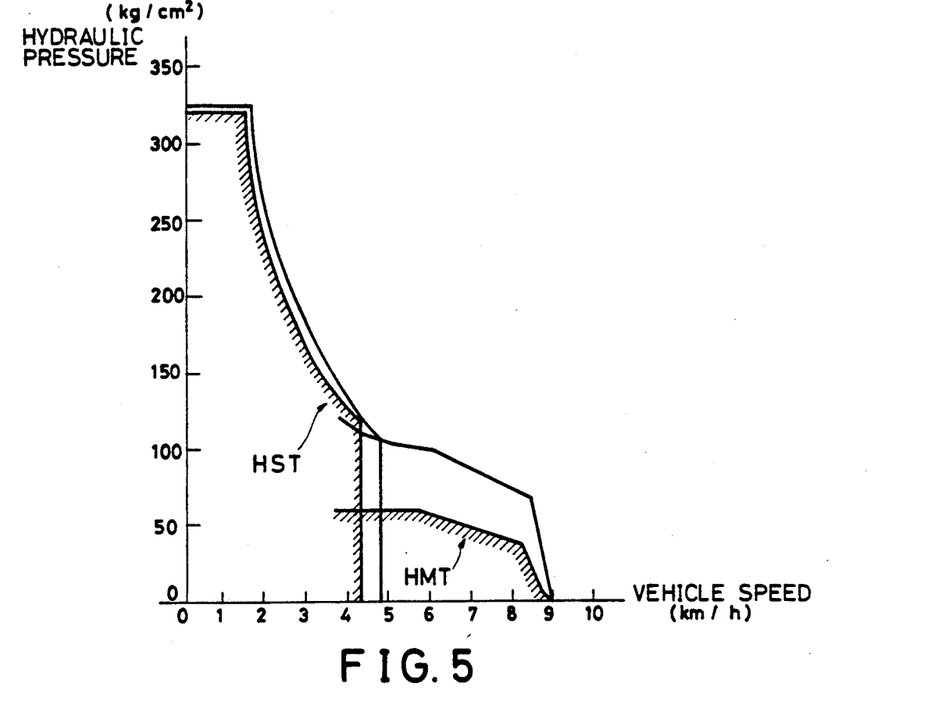
FIG. 5 is a chart illustrating the relationship between the vehicle speed and hydraulic pressure.

When the vehicle trams at a low speed, e.g., at 4.2 Km/h or lower speed as viewed in FIG. 5, the left 1st speed clutch 38 and the right 1st speed clutch 40 are engaged, as viewed in FIG. 2, while the F2 clutch 37 and the R2 clutch 39 are disengaged. In this state, the system functions as the HST. Consequently, the output power of the engine 1 is transmitted from the left and right hydraulic pumps 2, 3 which are controlled to maintain a constant value of the product of the delivery pressure P and the displacement V to the hydraulic motors 4, 5 and further to the left and right sun gears 14, 21 through the left and right motor gears 11, 12. In this state, the differential planetary gear devices 101 and 151 are in direct-connection state so that the rotations of the sun gears are transmitted to the planet carriers to rotate them at the same speed as the sun gears and further to the ring gears to rotate them at the same speed as the planet carriers, whereby the left and right final drive gears 18 and 25 are driven. Consequently, the speed of the vehicle is increased in proportion to the rotation speed of the motor gears of the hydraulic motors as shown by AB (forward) and AE (reverse) in FIG. 4. In order to maintain the course of the vehicle running straight, the center clutch 36 is engaged to equalize the speeds of the left and right driving wheels. The power transmission path between the propeller shaft 27 and the F2 and R2 driven gears 34, 35 via the bevel gear 29 only idles and does not make any contribution to the transmission of the power.

When the vehicle is to be steered to the left or right, the center clutch 36 is disengaged to allow the left and right drive shafts 13, 20 to rotate independently, and the rates of supply of the hydraulic fluid to the left and right hydraulic pumps 2, 3 are suitably varied to cause a change in the speed between the hydraulic motors 4 and 5, thereby effecting a gentle turn, quick turn or ultra-quick turn of the vehicle, while maximizing the traction power of the vehicle during turning.

Figure 3:
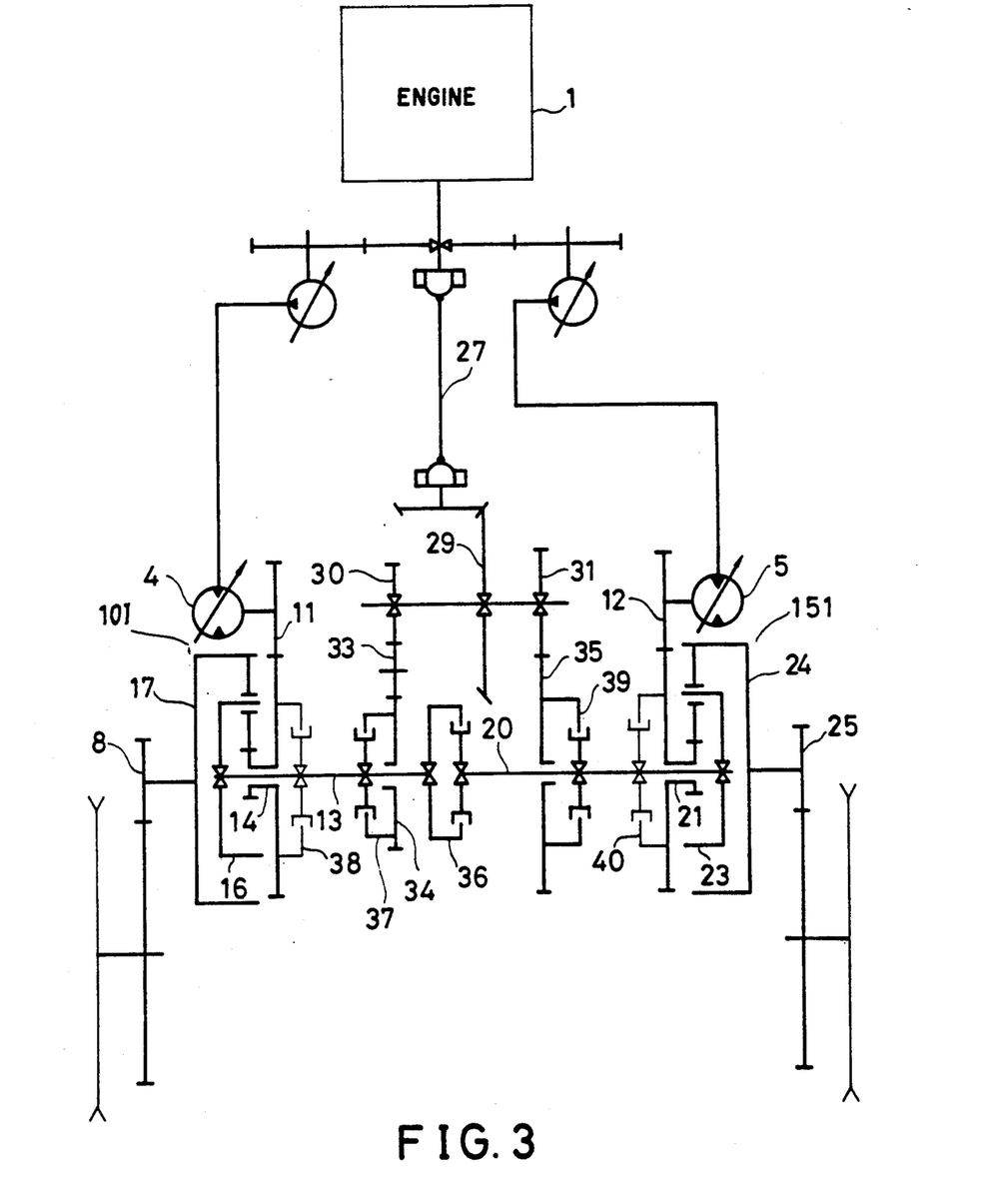

For a high-speed forward tramming, e.g., forward tramming at a speed higher than 4.2 Km/h as viewed in FIG. 5, the left and right 1st speed clutches 38, 40 are disengaged and the center clutch 36 and the F2 clutch 37 are engaged, as viewed in FIG. 3. In this state, the system performs the function of HMT so that the output torque of the engine is transmitted from the propeller shaft 27 to the left and right drive shafts 13, 20 through the bevel gear 29, F2 drive gear 30, idle gear 33 and the F2 driven gear 34, whereby the planet carriers 16, 23 of the differential planetary gear devices 101 and 151 are mechanically driven.

The power transmitted from the left and right hydraulic pumps 2, 3 to the motor gears 11, 12 through the hydraulic motors 4, 5 drive the left and right sun gears 14, 21 so that the ring gears 17, 24 of the differential planetary gear devices 101, 151 drive the left and right final drive gears 18, 25 by the sum of the mechanical power derived from the planet carriers 16, 23 and the hydraulic power transmitted through the sun gears 14, 21. When the vehicle is to be steered to the left or right during high speed tramming, a difference is produced between the operation speeds of the left and right hydraulic motors 4, 5 by differentiating the rates of supply of the hydraulic fluid from the left and right hydraulic pumps 2, 3.

For a high-speed reversing of the vehicle, the F2 clutch 37 is disengaged and the R2 clutch 39 is engaged so that the mechanical power is transmitted from the bevel gear 29 to the R2 driven gear 35 through the R2 drive gear 31. Operations or other parts are the same as those in forward high-speed tramming.

The vehicle speeds at high speed ranges vary along the curves BCD (forward) and the curve EFG (reverse) shown in FIG. 4. Namely, a reduction in the operation speed of the hydraulic motors 4, 5 causes a reduction in the rotation speeds of the sun gears 14, 21 but the vehicle speed increases because the rotation speeds of the ring gears 17, 24 increase in inverse proportion to the rotation speeds of the sun gears 14, 21. The speed of the hydraulic motors 4, 5 is null at the point C during forward tramming and the hydraulic motors 4, 5 start to reverse as the point C is exceeded. The speed of the hydraulic motors is then progressively increased. During reversing, hydraulic motors 4, 5 are reversed and the speed of these hydraulic motors becomes null at the point F and, thereafter, the hydraulic motors 4, 5 start to operate forward and progressively increase their speed.

As will be understood from the foregoing description, according to the invention, the vehicle is driven through HST in the 1st-speed range in which delicate control is required. It is therefore possible to obtain good maneuverability equivalent to that of conventional pure HST drive vehicle. Furthermore, since the left and right output shafts are driven commonly through the coupling device, a high steadiness or course holding characteristic can be attained without being affected by the efficiencies of the hydraulic pumps and motors. In addition, the control is facilitated because there is no need for the control of the displacements of the hydraulic pumps and the hydraulic motors. Moreover, efficiency can be increased by about 10% or more as compared with the pure HST type drive system in which all the power is transmitted through an HST system alone, by virtue of the use of the HMT system in which the driving power is transmitted both through the HST system and the mechanical transmission system in the high speed region where a large driving power is required. It is also to be pointed out that the present invention enables the capacities of the hydraulic pump and the hydraulic motor to be reduced to about half those in the known system thanks to the use of rotation of the differential planet gear device, thus offering an advantage also in the aspect of the cost. More particularly, according to the invention, it is possible to obtain an inexpensive power transmission system which can realize a high tramming speed of 8.5 Km/h or so at the maximum, by using, in combination with the mechanical driving system, hydraulic pumps and hydraulic motors of capacities which can provide, when used in a pure HST driving system, only a low tramming speed of 4 Km/h or so at the maximum.

In the described embodiment of the invention, each hydraulic pump is connected to the associated hydraulic motor through one hydraulic line. It will be clear, however, that the hydraulic pump and the hydraulic motor are actually connected to form an open circuit, semi-open circuit or a closed circuit incorporating a change-over valve or a control valve to enable the control in the same manner a that in known systems.

INDUSTRIAL APPLICABILITY

The 2-path HMT system of the present invention, as well as the control method of the same, can effectively used as a speed-change/steering system of crawler-type vehicles.

I claim:

1. A 2-path hydromechanical transmission system, suitable for use with a vehicle having a left driven wheel and a right driven wheel, said system comprising:
   an engine;
   a first power transmission line including a left hydraulic pump, a right hydraulic pump, said left and right hydraulic pumps being independent from each other, said left and right hydraulic pumps being driven by said engine, a left hydraulic motor associated with said left hydraulic pump so as to be driven by the output of said left hydraulic pump, a right hydraulic motor associated with said right hydraulic pump so as to be driven by the output of said right hydraulic pump, a left gear train for transmitting the output torque of said left hydraulic motor to a left drive wheel, a right gear train for transmitting the output torque of said right hydraulic motor to a right drive wheel, to thereby provide a driving force from said first power transmission line to said left and right drive wheels;
   a left drive shaft associated with said left gear train, a right drive shaft associated with said right gear train;
   a coupling device having a center clutch for selectively coupling said left drive shaft and said right drive shaft so that said left drive shaft and said right drive shaft are driven commonly through said coupling device when said center clutch is engaged;
   a second power transmission line including a forward high speed clutch, a reverse high speed clutch, a reduction gear device including a bevel gear for distributing output torque of said engine through a selected one of said forward high speed clutch and said reverse high speed clutch and through said left drive shaft and said right drive shaft to said left and right gear trains to thereby provide a driving force from said second power transmission line to said left and right drive wheels;
   whereby said first power transmission line can provide the power for driving the vehicle at a low speed, and said first and second power transmission lines can, in combination, provide the power for driving the vehicle at a high speed.

2. A 2-path hydromechanical transmission system according to claim 1, wherein said left gear train comprises a left reduction gear train and a left reduction planetary gear train, with said left reduction gear train being connected between said left hydraulic motor and said left reduction planetary gear train; and wherein said right gear train comprises a right reduction gear train and a right reduction planetary gear train, with said right reduction gear train being connected between said right hydraulic motor and said right reduction planetary gear train.

3. A 2-path hydromechanical transmission system according to claim 2, wherein said left reduction gear train comprises a left motor gear which is driven by said left hydraulic motor, and a first sun gear, wherein said first sun gear idles on said left drive shaft and meshes with said left motor gear; and wherein said right reduction gear train comprises a right motor gear which is driven by said right hydraulic motor, and a second sun gear, wherein said second sun gear idles on said right drive shaft and meshes with said right motor gear.

4. A 2-path hydromechanical transmission system according to claim 3, wherein said left reduction planetary gear train comprises a left differential planetary gear device and a left drive gear directly connected to the output of said left differential planetary gear device; and wherein said right reduction planetary gear train comprises a right differential planetary gear device and a right drive gear directly connected to the output of said right differential planetary gear device.

5. A 2-path hydromechanical transmission system according to claim 3, wherein said left reduction planetary gear train comprises a left planetary gear, a third sun gear, said third sun gear being connected to said first sun gear and meshing with said left planetary gear, a left planet carrier, a left ring gear, and a left drive gear directly connected to said left ring gear; and wherein said right reduction planetary gear train comprises a right planetary gear, a fourth sun gear, said fourth sun gear being connected to said second sun gear and meshing with said right planetary gear, a right planet carrier, a right ring gear, and a right drive gear directly connected to said right ring gear.

6. A 2-path hydromechanical transmission system according to claim 5 wherein said left planet carrier is connected to said left drive shaft, wherein said right planet carrier is connected to said right drive shaft, wherein a left low speed clutch connects said first sun gear to said left drive shaft, and wherein a right low speed clutch connects said second sun gear to said right drive shaft.

7. A 2-path hydromechanical transmission system according to claim 6 wherein said forward high speed clutch connects said reduction gear device to one of said left drive shaft and said right drive shaft, and wherein said reverse high speed clutch connects said reduction gear device to the other of said left drive shaft and said right drive shaft.

8. A vehicle having a left drive wheel, a right drive wheel, and a 2-path hydromechanical transmission system in accordance with claim 7.

9. A vehicle having a left drive wheel, a right drive wheel, and a 2-path hydromechanical transmission system in accordance with claim 1.

10. A method for controlling the speed and direction of motion of a vehicle having a left drive wheel, a right drive wheel, and a 2-path hydromechanical transmission system mounted on said vehicle, said 2-path hydromechanical transmission system having an engine, a first power transmission line, and a second power transmission line; said first power transmission line including a left hydraulic circuit and a right hydraulic circuit; said left hydraulic circuit including a left hydraulic pump which is driven by said engine, a left hydraulic motor which is driven by said left hydraulic pump, a left gear train for transmitting the output torque of said left hydraulic motor to said left drive wheel, and a left drive shaft associated with said left gear train; said right hydraulic circuit including a right hydraulic pump which is driven by said engine, a right hydraulic motor which is driven by said right hydraulic pump, a right gear train for transmitting the output torque of said right hydraulic motor to said right drive wheel, and a right drive shaft associated with said right gear train; said left and right hydraulic pumps being independent from each other; said second power transmission line including a forward high speed clutch, a reverse high speed clutch, a reduction gear device for distributing output torque of said engine through a selected one of said forward high speed clutch and said reverse high speed clutch and through said left drive shaft and said right drive shaft to said left and right gear trains to thereby provide a driving force from said second power transmission line to said left and right drive wheels; wherein said method comprises:

utilizing only said first power transmission line to drive said left drive wheel and said right drive wheel during a low speed mode, coupling said left drive shaft and said right drive shaft so that said left drive shaft and said right drive shaft are commonly driven when it is desired that said vehicle move in a straight line during said low speed mode, and uncoupling said left drive shaft and said right drive shaft and driving said left hydraulic motor and said right hydraulic motor at different speeds while said left drive shaft and said right drive shaft are thus uncoupled, when it is desired that said vehicle turn during said low speed mode.

11. A method in accordance with claim 10 further comprising:

utilizing both said first power transmission line and said second power transmission line to drive said left drive wheel and said right drive wheel during a high speed mode.

12. A method in accordance with claim 11 wherein said reduction gear device is connected through said reverse high speed clutch to one of said left and right drive shafts when it is desired that said vehicle move backwardly during a high speed mode.

13. A method in accordance with claim 11 wherein said reduction gear device is connected through said forward high speed clutch to one of said left and right drive shafts when it is desired that said vehicle move forwardly during a high speed mode.

14. A method in accordance with claim 13 wherein said reduction gear device is connected through said reverse high speed clutch to one of said left and right drive shafts when it is desired that said vehicle move backwardly during a high speed mode.

15. A method in accordance with claim 14 further comprising:

coupling said left drive shaft and said right drive shaft during said high speed mode so that said left drive shaft and said right drive shaft are commonly driven.

16. A method in accordance with claim 15 further comprising:

driving said left hydraulic motor and said right hydraulic motor at different speeds while said left drive shaft and said right drive shaft are coupled, when it is desired that said vehicle turn during said high speed mode.

17. A method in accordance with claim 11 further comprising:

coupling said left drive shaft and said right drive shaft during said high speed mode so that said left drive shaft and said right drive shaft are commonly driven.

18. A method in accordance with claim 11 further comprising driving said left hydraulic motor and said right hydraulic motor at different speeds while said left drive shaft and said right drive shaft are coupled, when it is desired that said vehicle turn during said high speed mode.

19. A method in accordance with claim 11 wherein said reduction gear device is connected through said reverse high speed clutch to one of said left and right drive shafts when it is desired that said vehicle move backwardly during a high speed mode.

* * * * *